(12) United States Patent
Solfrank

(10) Patent No.: US 8,387,584 B2
(45) Date of Patent: Mar. 5, 2013

(54) UNBALANCED SHAFT

(75) Inventor: Peter Solfrank, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 393 days.

(21) Appl. No.: 12/835,234

(22) Filed: Jul. 13, 2010

(65) Prior Publication Data
US 2011/0023809 A1 Feb. 3, 2011

(30) Foreign Application Priority Data
Jul. 29, 2009 (DE) .......................... 10 2009 035 112

(51) Int. Cl.
*F02B 75/06* (2006.01)
*F16C 3/04* (2006.01)
(52) U.S. Cl. ....................................... 123/192.2; 74/603
(58) Field of Classification Search ............... 123/192.2, 123/196 R; 74/603; 184/6.5
See application file for complete search history.

(56) References Cited

FOREIGN PATENT DOCUMENTS

| DE | 19947271 | 4/2000 |
|---|---|---|
| DE | 102004014014 | 10/2005 |
| DE | 102007009800 | 10/2007 |
| DE | 102007017873 | 10/2008 |
| DE | 102007027990 | 12/2008 |
| EP | 1775484 | 4/2007 |
| JP | 09151993 | 6/1997 |
| JP | 11101311 | 4/1999 |
| WO | 2005088163 | 9/2005 |

*Primary Examiner* — Noah Kamen
(74) *Attorney, Agent, or Firm* — Volpe and Koenig, P.C.

(57) ABSTRACT

An unbalanced shaft (1a, 1b, 1c), particularly for compensating mass forces and/or mass moments of inertia of an internal combustion engine (2) is provided. The shaft includes a shaft section (10, 11, 12) and a bearing journal (13a, 13b, 13c) axially adjacent to the shaft section, the bearing journal includes a fully cylindrical outer peripheral surface (18) serving as an inner raceway for the rolling elements (16) of a rolling bearing (14) and the bearing journal has a multi-piece configuration, so that both the shaft section and the bearing journal possess a mass center of gravity that, for producing the shaft unbalance, extends eccentric to the axis of rotation (19) of the unbalanced shaft. For supplying lubricant to the inner raceway and the rolling elements, an oil channel (20a, 20b, 20c) extends radially outwards through the bearing journal and opens, relative to the mass center of gravity of the bearing journal, on the other side, situated beyond the axis of rotation, on the outer peripheral surface.

7 Claims, 2 Drawing Sheets

UNBALANCED SHAFT

CROSS-REFERENCE TO RELATED APPLICATIONS

This application claims the benefit of German Patent Application No. 10 2009 035 112.4, filed Jul. 29, 2009, which is incorporated herein by reference as if fully set forth.

FIELD OF THE INVENTION

The invention concerns an unbalanced shaft comprising a shaft section and a bearing journal axially adjacent to the shaft section, said bearing journal comprising a fully cylindrical outer peripheral surface serving as an inner raceway for rolling elements of a rolling bearing and said bearing journal having a multi-piece configuration, so that both the shaft section and the bearing journal possess a mass center of gravity that, for producing a shaft unbalance, extends eccentric to an axis of rotation of the unbalanced shaft. The unbalanced shaft serves particularly for compensating mass forces and/or mass moments of inertia of an internal combustion engine.

BACKGROUND

Generic unbalanced shafts are disclosed in DE 10 2007 009 800 A1 and DE 10 2007 027 990 A1. These achieve a significant reduction of mass of the unbalanced shaft by the fact that not only the shaft sections but also the bearing journals participate in the production of the shaft unbalance. For this purpose, the bearing journals possess the shape of a fractional cylinder having a cross-sectional surface that is substantially mirror symmetrical to the likewise rotating unbalance direction and whose planar center of gravity is eccentric to the axis of rotation in unbalance direction. The circular arc-shaped outer peripheral surface of the fractional cylinder is completed into a full cylinder through a bearing ring or a bearing ring piece joined thereto for obtaining a closed inner raceway, i.e. a raceway extending through 360° for the rolling elements of a rolling bearing that serves for a low-friction mounting of the unbalanced shaft in the internal combustion engine.

In contrast to hydrodynamic sliding bearings, it is possible in rolling bearing-mounted unbalanced shafts to omit the pressurized lubricant supply to the bearing journals and replace it with a pressure-less lubricant supply. According to EP 1 775 484 A2, this can be realized through the oil mist formed during operation, an adequate quantity of which reaches the rolling elements which project locally from the outer periphery of the variable-width bearing journal. In the case of the initially cited documents, however, there exists a danger of a wear-promoting deficient lubrication of the rolling contact between the rolling elements and the inner raceway because the inner raceway is a completely closed inner raceway without adequate lubricant access into the interior of the rolling bearing.

SUMMARY

It is therefore the object of the present invention to improve a rolling bearing-mounted unbalanced shaft of the above-noted type, so that the risk of a deficient lubrication of the rolling bearing-mounting during operation is minimized.

The above object is achieved according to the invention, and advantageous developments and forms of embodiment are described in detail below and in the claims. According to the invention, for supplying lubricant to the inner raceway and the rolling elements, an oil channel extends radially outwards through the bearing journal and, relative to the mass center of gravity of the bearing journal, the channel opens on another side, situated beyond the axis of rotation, on the outer peripheral surface. In other words, the oil channel constitutes a freely traversable connection between the surroundings of the bearing journal filled with oil mist and the outer peripheral surface of the bearing journal to enable an adequate quantity of lubricant to be supplied to the rolling elements and the inner raceway. The radial position of the oil channel opening situated preferably centrally in axial direction on the outer peripheral surface at a distance from the center of gravity (i.e. in the low-load peripheral region of the bearing journal) is chosen on the one hand, because the inner raceway in the region of the likewise rotating load zone on the side of the center of gravity is free of interruptions and therefore has a maximum bearing capacity for the rolling contact. On the other hand, as provided in preferred embodiments of the invention, such an arrangement of the oil channel can be advantageous from the manufacturing point of view. If necessary, it is understood that a plurality of such oil channels can be provided.

In a first advantageous embodiment of the invention, the bearing journal is composed of a bearing journal core made integrally with the shaft section and having only a partially cylindrical configuration, and of a bearing ring that completely surrounds the bearing journal core. The oil channel extends radially through a fractional periphery of the bearing ring, which fractional periphery is situated diametrically opposite the center of gravity of the bearing journal and freely spans the bearing journal core. Whereas the closed bearing ring is configured with thinnest possible walls with a view to achieving a small mass of the unbalanced shaft and is made advantageously of a rolling bearing steel such as 100Cr6, the unbalanced shaft can also be fabricated as a low-cost casting without any particular bearing capacity for a rolling contact.

In a second advantageous embodiment of the invention, the bearing journal is composed of a bearing journal section made integrally with the shaft section and having only a partially cylindrical configuration, and of a bearing ring piece adjoining the bearing journal section. The oil channel extends radially through the bearing ring piece which is situated diametrically opposite the center of gravity of the bearing journal and freely spans the bearing journal section. Differently from the preceding first embodiment, the inner raceway in this case is made up of the circular arc-shaped outer peripheral surface of the bearing journal section extending in the region of the load zone, and is further made up of the circular arc-shaped outer peripheral surface of the bearing ring piece extending outside of the load zone. Because the bearing journal section serves directly as an inner raceway for the rolling elements, it is appropriate, with regard to the rolling contact, to configure the unbalanced shaft as a forging with an adequate bearing capacity.

In a third advantageous embodiment of the invention, the bearing journal is comprised of a bearing journal section made integrally with the shaft section and having only a partially cylindrical configuration, and of a bearing segment that completes the bearing journal section into the form of a cylinder which is closed on both axial ends. The oil channel extends between one of the axial ends and the outer peripheral surface of the bearing segment radially through the bearing segment which is situated diametrically opposite the center of gravity of the bearing journal. A bearing segment rigidified in its shape through axial end walls is to be preferred if the bearing segment is made of a light-weight material with a low intrinsic rigidity and serves only for the radial guidance of the rolling elements on the inner raceway. Such a bearing segment has a particularly small mass and can, at the same time, be made economically as an injection molded part of plastic. In addition, the bearing segment can be configured either as a hollow body or as a solid part. In the latter case, the oil channel should be made as a bore extending at an inclination to the axis of rotation of the unbalanced shaft.

The aforesaid fabricating advantages in the manufacture of the oil channel result in the case of the embodiments described above by the fact that the oil channels do not have to be made as complex and expensive bores through the bearing journal core or section, but it suffices to provide, for example, a punched opening in the relatively thin-walled bearing ring or bearing ring piece. In the case of a bearing segment made of plastic, the oil channel can be provided as a bore made without chip removal already in the injection molding die.

BRIEF DESCRIPTION OF THE DRAWINGS

Further features of the invention result from the following description and the appended drawings in which examples of embodiment of inventive unbalanced shafts are shown in perspective and partially simplified representations. If not otherwise stated, similar or functionally similar features or components are identified by the same reference numerals. The figures show.

DETAILED DESCRIPTION OF THE PREFERRED EMBODIMENTS

Figure 1:
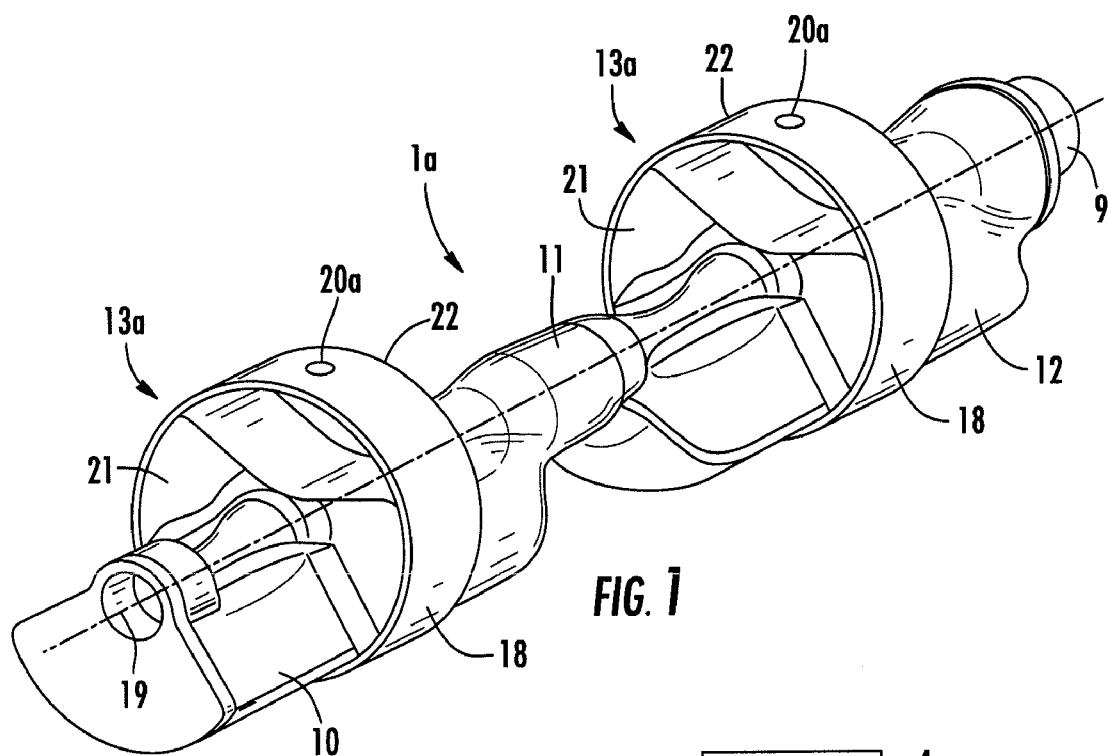
FIG. 1 is a view of an unbalanced shaft according to a first embodiment of the invention.
Figure 2:
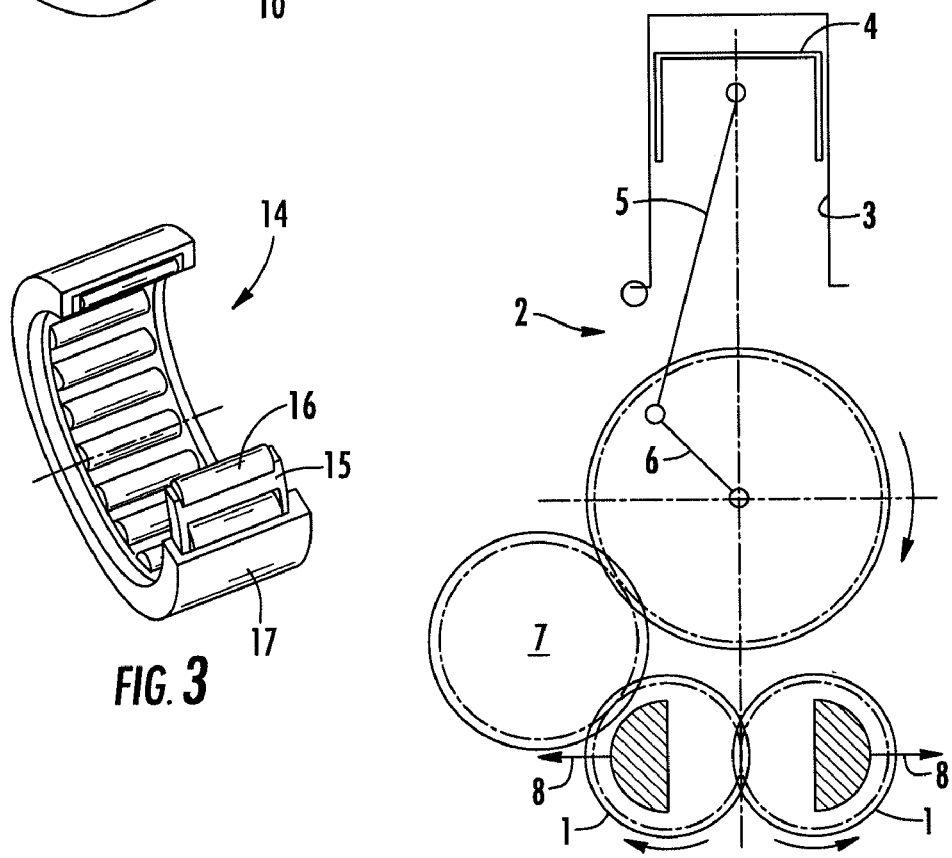
FIG. 2 is a schematic view of an internal combustion engine comprising a mass compensation.
Figure 4:
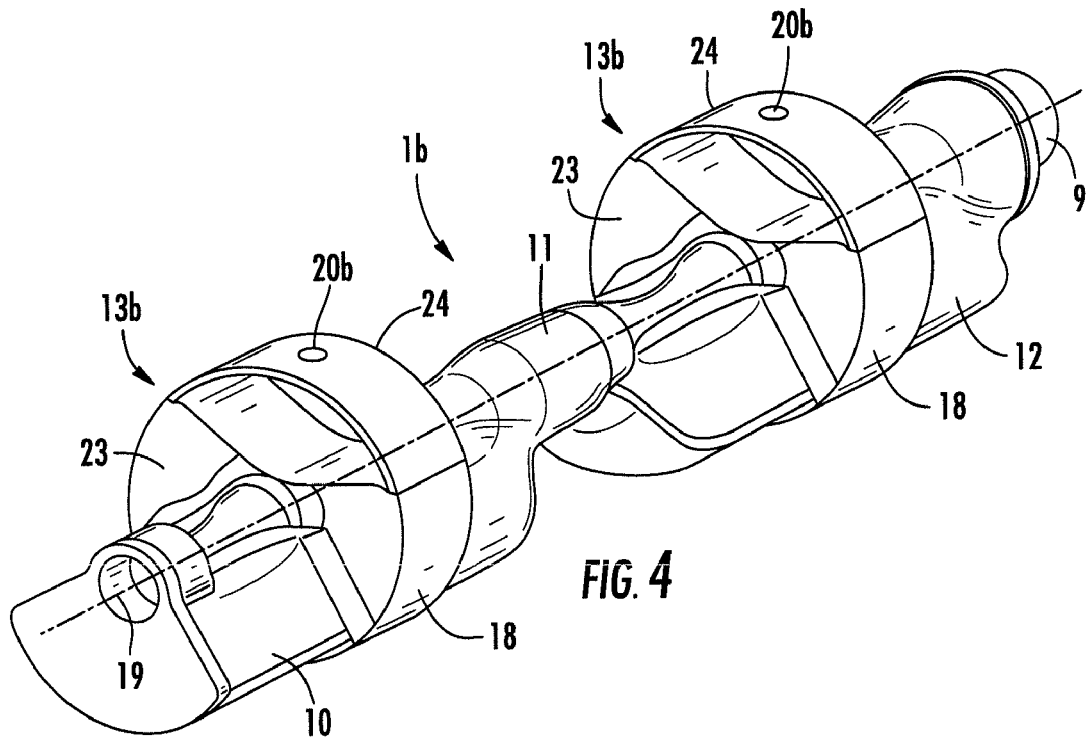
FIG. 4 is a view of an unbalanced shaft according to a second embodiment of the invention.
Figure 5:
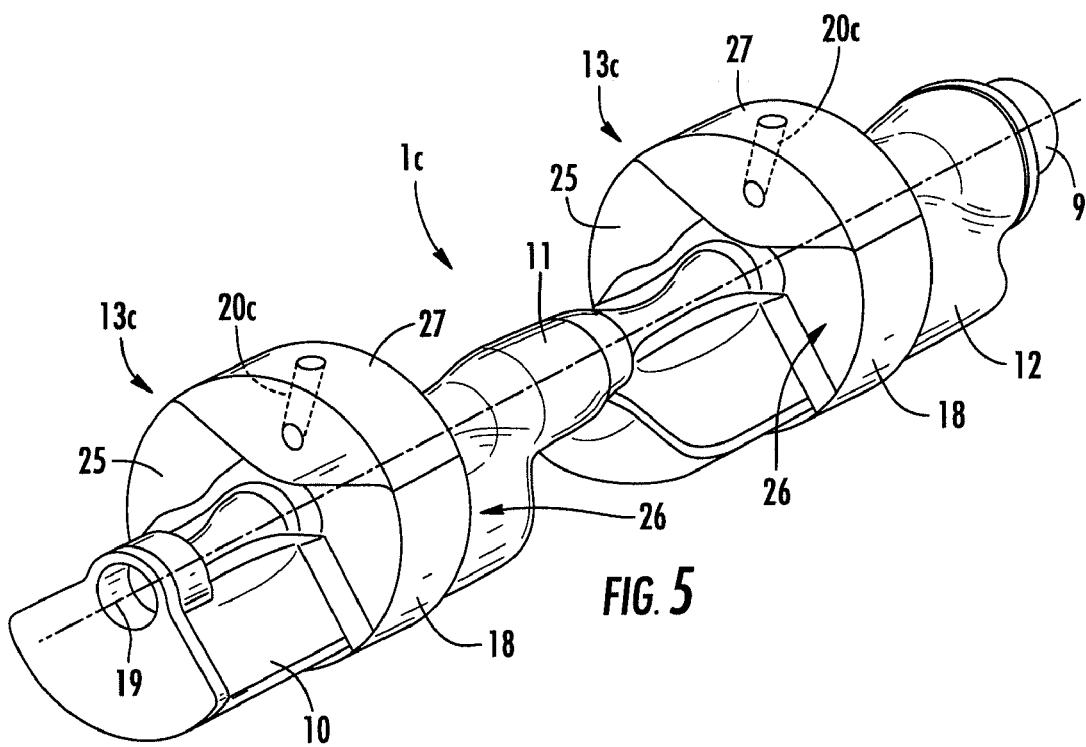
FIG. 5 is a view of an unbalanced shaft according to a third embodiment of the invention.

FIGS. 1, 4 and 5 disclose unbalanced shafts 1 that serve for compensating second order mass forces of an internal combustion reciprocating piston engine in a 4-cylinder in-line engine. Such a mass compensation mechanism, also called Lancaster compensation, is disclosed in the schematic representation of the mechanism in FIG. 2. The internal combustion engine 2 comprises four pistons 4 oscillating in cylinders 3 whose longitudinal movement is converted through connecting rods 5 into rotation of a crankshaft 6. In the present case, the crankshaft 6 drives, through an intermediate shaft 7, two unbalanced shafts 1 comprising unbalanced masses 8, said unbalanced shafts 1 rotating parallel to the crankshaft 6 and in opposing directions to each other at double the speed of rotation of the crankshaft.

Figure 3:
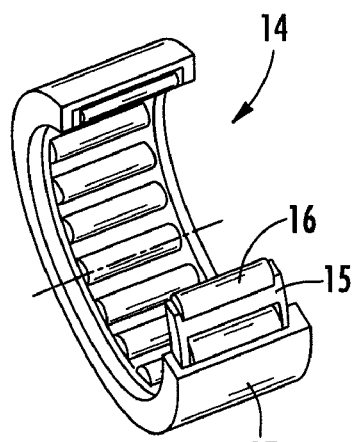
FIG. 3 is a perspective view, partially in cross-section, of a rolling bearing for a radial mounting of the unbalanced shaft in the internal combustion engine.

The unbalanced shafts 1 that are driven at a drive section 9, for instance through a sprocket or a gearwheel, comprise respectively, three shaft sections 10, 11 and 12 and, axially adjacent to these, two bearing journals 13 on which the unbalanced shafts 1 are radially mounted using rolling bearings on housing mounting points of the internal combustion engine 2. As shown in FIG. 3, the rolling bearings used are needle roller bushings 14 composed of a cage 15, rolling elements in the form of needle rollers 16 guided therein and a thin-walled outer ring 17 made without chip removal. The outer peripheral surfaces 18 of the multi-piece, in the present case two-piece, bearing journals 13 are fully cylindrical and serve as inner raceways for the needle rollers 16.

With the aim of realizing as small a shaft mass as possible, not only the shaft sections 10, 11 and 12 but also the bearing journals 13 posses mass centers of gravity which, for producing the shaft unbalance, extend eccentric to the axis of rotation 19 and substantially in a common unbalance plane. Because, as known, in the case of a radial mounting of the unbalanced shafts 1, the rotational conditions cause a lumped load on the bearing journals 13 and a peripheral load on the housing mounting points of the internal combustion engine 2, a stationary load zone is formed on the outer peripheral surfaces 18 of the bearing journals 13 which, relative to the mass center of gravity is situated on a same side of the axis of rotation 19 and extends symmetrically to the plane of unbalance. In contrast, the fractional periphery of the bearing journals 13 situated diametrically opposite to the load zone is substantially free of load.

According to the following examples of embodiments according to the invention, the lubricant supply to the rolling bearing-mounting points is achieved respectively through oil channels 20 that extend radially outwards in the bearing journals 13 and open on the load-free fractional periphery, i.e. relative to the mass center of gravity, on another side situated beyond the axis of rotation 19, axially at the center of the inner raceways 18. In this way, the inner raceways 18 and the needle rollers 16 are adequately supplied with lubricant which, with the help of the centrifugal acceleration due to the rotation of the unbalanced shafts 1, is transported to the rolling contact areas out of the surroundings of the bearing journals 13 filled with oil mist during operation. As can be clearly seen in FIG. 3, an axial transport of lubricant between the outer peripheral surface 18 of the bearing journals 13 and the radially inwards extending axial flanges of the outer ring 17, as well as between the outer peripheral surface 18 and the cage 15, is only restrictedly possible and can lead to failure of the rolling bearings due to deficient lubrication.

In the case of the unbalanced shaft 1a of FIG. 1, each of the bearing journals 13a comprises a bearing journal core 21 that is integral to, i.e. made in one piece with the shaft sections 10, 11, 12 and has only a partially cylindrical shape, and further comprises a bearing ring 22 made of a thin-walled rolling bearing steel and completely surrounding the bearing journal core, said core and said ring being assembled firmly together. The oil channel 20a made as a punched opening extends through a fractional periphery of the bearing ring 22 which freely spans the bearing journal core 21.

In the unbalanced shaft 1b of FIG. 4, each of the bearing journals 13b comprises a bearing journal section 23 that is formed integrally on the shaft sections 10, 11, 12 and has only a partially cylindrical shape, and further comprises a bearing ring piece 24 adjoining the bearing journal section 23. In contrast to the bearing journal 13a which does not form a part of the inner raceway 18 and serves only for fixing and supporting the bearing ring 22, in the present embodiment, the inner raceway 18 is formed both by the circular arc-shaped outer peripheral surface of the bearing journal section 23 and by the circular arc-shaped outer peripheral surface of the bearing ring piece 24 adjoining the bearing journal section 23 in flush relationship on the periphery. The oil channel 20b, likewise made as a punched opening, extends through the bearing ring piece 24 which freely spans the bearing journal section 23. Similar to the bearing journal 13a of FIG. 1, the oil mist, situated in the intermediate space between the bearing journal section 23 and the bearing ring piece 24, penetrates into the interior of the rolling bearing through the oil channel 20b.

In the unbalanced shaft 1c of FIG. 5, each of the bearing journals 13c likewise comprises a bearing journal section 25 that is formed integrally on the shaft sections 10, 11, 12 and has only a partially cylindrical shape, and further comprises a bearing segment 27 that completes the bearing journal section 25 into a cylinder that is closed on both axial ends 26. In this case, too, the inner raceway 18 is formed both by the circular arc-shaped outer peripheral surface of the bearing journal section 25 and the circular arc-shaped outer peripheral surface of the bearing segment 27 adjoining the circular arc-shaped outer peripheral surface of the bearing journal section 25 in flush relationship. The bearing segments 27 are solid injection molded parts of plastic, the oil channel 20c being configured as a bore extending through the bearing segment 27 at an inclination to the axis of rotation 19 and conveying the oil mist situated adjacent the bearing journal 13c into the interior of the rolling bearing.

The method, not represented, of fixing the bearing rings 22, bearing ring pieces 24 or bearing segments 27 to the respective bearing journals 13a to 13c can be a known fixing method based on fusion of material, force locking or positive engagement.

List of Reference Numerals
1 Unbalanced shaft
2 Internal combustion engine
3 Cylinder
4 Piston
5 Connecting rod
6 Crankshaft
7 Intermediate shaft
8 Unbalanced mass
9 Driving section
10 Shaft section
11 Shaft section
12 Shaft section
13 Bearing journal
14 Rolling bearing/needle roller bushing
15 Cage
16 Needle rollers/rolling elements
17 Outer ring
18 Outer peripheral surface/inner raceway
19 Axis of rotation of unbalanced shaft
20 Oil channel
21 Bearing journal core
22 Bearing ring
23 Bearing journal section
24 Bearing ring piece
25 Bearing journal section
26 Axial end
27 Bearing segment

The invention claimed is:

1. An unbalanced shaft for compensating at least one of mass forces or mass moments of inertia of an internal combustion engine, the shaft comprising a shaft section and a bearing journal axially adjacent to the shaft section, the bearing journal comprising a fully cylindrical outer peripheral surface serving as an inner raceway for rolling elements of a rolling bearing and the bearing journal having a multi-piece configuration, so that both the shaft section and the bearing journal possess a mass center of gravity that, for producing a shaft unbalance, extends eccentric to an axis of rotation of the unbalanced shaft, and for supplying lubricant to the inner raceway and the rolling elements, an oil channel extends radially outwards through the bearing journal, and relative to the mass center of gravity of the bearing journal, the oil channel opens on another side, situated beyond the axis of rotation, on the outer peripheral surface.

2. The unbalanced shaft of claim 1, wherein the oil channel opens at an axially substantially central position on the outer peripheral surface of the bearing journal.

3. The unbalanced shaft of claim 1, wherein the bearing journal is comprised of a bearing journal core made integrally with the shaft section and having only a partially cylindrical configuration, and of a bearing ring that completely surrounds the bearing journal core, and the oil channel extends radially through a fractional periphery of the bearing ring, which fractional periphery is situated diametrically opposite the center of gravity of the bearing journal and freely spans the bearing journal core.

4. The unbalanced shaft of claim 1, wherein the bearing journal is comprised of a bearing journal section made integrally with the shaft section and having only a partially cylindrical configuration, and of a bearing ring piece adjoining the bearing journal section, and the oil channel extends radially through the bearing ring piece which is situated diametrically opposite the center of gravity of the bearing journal and freely spans the bearing journal section.

5. The unbalanced shaft of claim 1, wherein the bearing journal is comprised of a bearing journal section made integrally with the shaft section and having only a partially cylindrical configuration, and of a bearing segment that completes the bearing journal section into the form of a cylinder which is closed on both axial ends, and the oil channel extends, radially between one of the axial ends and the outer peripheral surface of the bearing segment, and through the bearing segment which is situated diametrically opposite the center of gravity of the bearing journal.

6. The unbalanced shaft of claim 5, wherein the bearing segment is an injection molded part of plastic.

7. The unbalanced shaft of claim 5, wherein the bearing segment is a solid part and the oil channel is configured as a bore.

* * * * *